United States Patent Office 3,737,493
Patented June 5, 1973

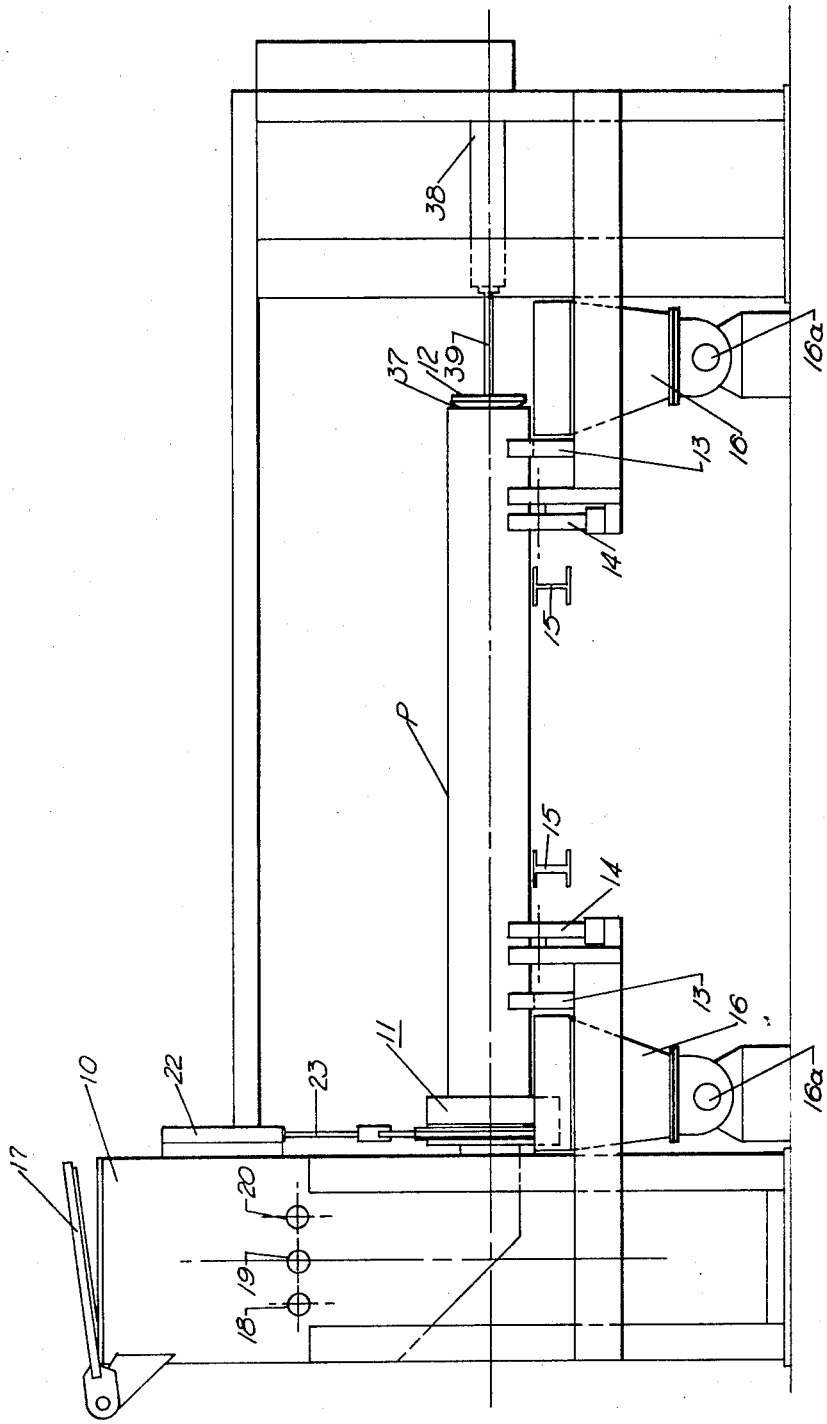

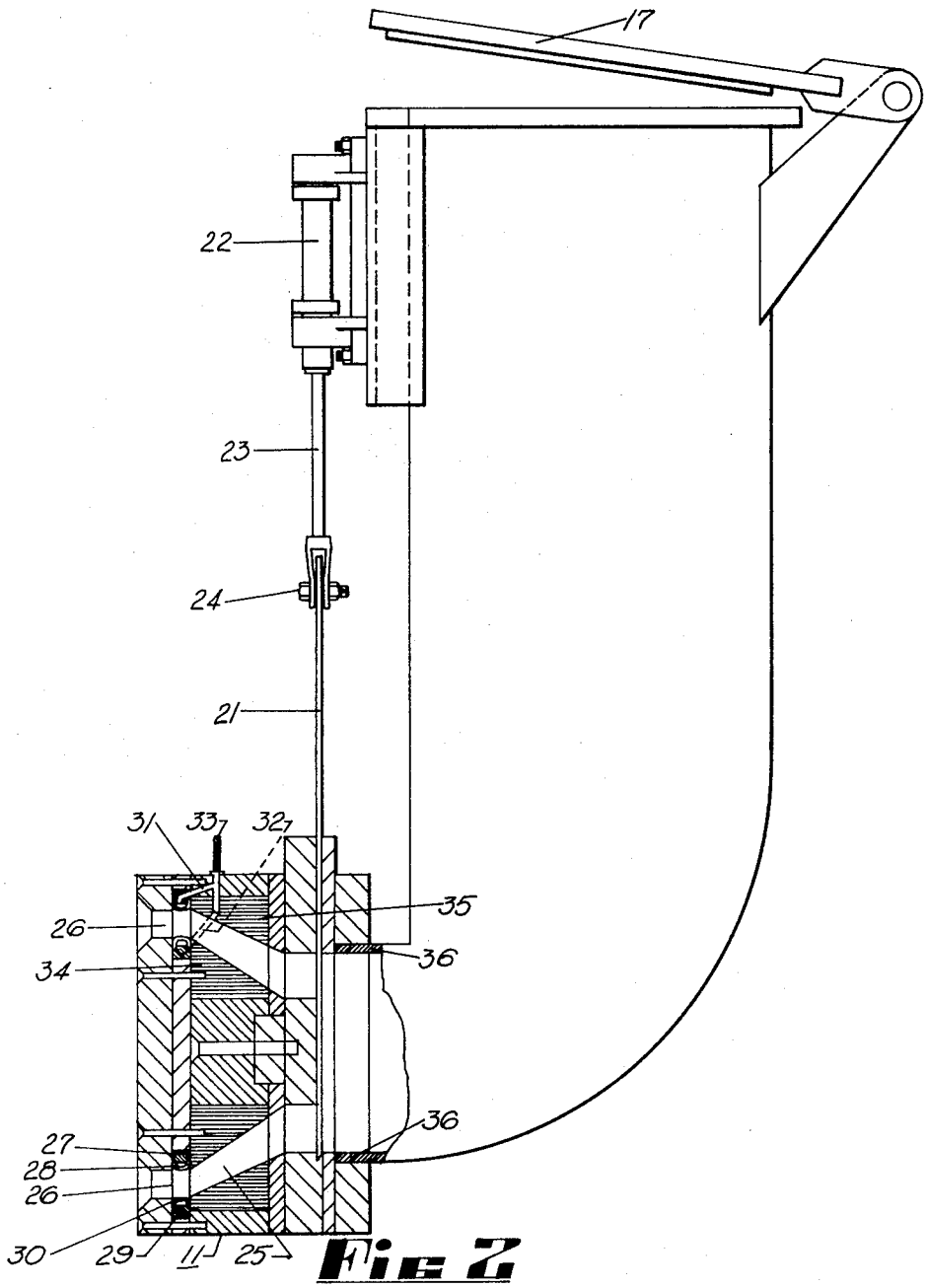

3,737,493
FILLING AN ANNULAR SPACE BETWEEN RADIALLY SPACED COAXIAL TUBES WITH FOAMED CEMENT
Leon Hacker, Springfield, Ill., assignor to Armco Steel Corporation, Middletown, Ohio
Filed Mar. 1, 1971, Ser. No. 122,596
Int. Cl. B28b 23/02, 23/06, 23/08
U.S. Cl. 264—42                    5 Claims

ABSTRACT OF THE DISCLOSURE

A method and an apparatus are disclosed for filling the annular space between radially spaced coaxial tubes constituting a double walled pipe. The pipe may be of extruded plastic and comprises inner and outer coaxial tubes with bracing and spacing means therebetween. The pipe at one of its ends is held against and sealed at its inner and outer end surfaces to a filling head and at its other end is held by a back-up plate engaging the inner one of the tubes, so that the space between the tubes is in communication with atmosphere. Foamed grout is initially introduced to the annular space, forming a reservoir, by gravity so as not to destroy its foamed character and then is forced under relatively low pressure through the annular space lengthwise of the pipe. Gate valve means are provided at the entrance end to initiate and terminate the flow of grout and overflow receptacles are provided at each end of the pipe to collect surplus grout which falls out when the pipe is separated from the filling head and back-up plate. This excess grout is then recirculated to the reservoir. After filling, the pipe is stored in racks for curing of the grout and is then ready for shipment.

BRIEF SUMMARY OF THE INVENTION

The invention has to do with a method and an apparatus for filling the annular cylindrical space between inner and outer walls constituting a pipe or conduit. A pipe or conduit which may be filled by the method and the apparatus of the present invention is disclosed and claimed in the Harry et al. patent, No. 3,379,221 granted Apr. 23, 1968. This patent discloses a conduit formed of concentric tubes of synthetic resinous material of specified flexural modulus, connected by spacing and bracing means which act in compression or in tension, rather than in mere resistance to flexing, to secure the concentric tubes against radial and angular displacement relative to one another. While the spacing and bracing means are capable of performing these functions by themselves, it is highly advantageous that they be assisted in this function by a filler which substantially entirely fills the spaces between the webs. According to said patent, this filler is a cementitious grout consisting of perlite, asbestos short fibers, portland cement, water, a resin, and sufficient air to produce a wet density of no more than about 50 pounds per cubic foot. This cementitious grout in accordance with said patent is pumped into the cells between the webs in the extruded product under pressure and the pipe is then allowed to cure for three to four days. According to the present invention, the annular space between the inner and outer tubes be filled with a foamed grout which is then cured in situ. In the filling of the annular space, care must be exercised that the foamed character of the grout is not destroyed.

Basically, the method involves permitting foamed grout to enter the annular space by gravity and then forcing the grout under relatively light pressure through the annular space lengthwise of of the pipe against atmospheric pressure. When the annular space is filled, the grout feed is stopped and excess grout is permitted to fall away into receptacles from which it is recirculated. The end of the pipe remote from the filling end has its annular space open to atmosphere so that the filling pressure need only overcome friction and atmospheric pressure.

From the apparatus standpoint, a reservoir is provided in communication with a filling head. The filling head is provided with a gate valve and with an annular groove of dimensions to accept an end of the pipe to be filled. Means are provided to seal the filling head against the inside and outside of the pipe. The pipe is held against the filling head in filling position by means of a back-up plate so designed that it does not obstruct the annular space at that end of the pipe.

The pipe approaches the apparatus by rolling transversely of its length on rails and is then picked up by a walking beam arrangement and deposited in supports. The back-up plate is then actuated to move the pipe axially into operative engagement with the filling head and the pipe is then sealed against the filling head. The gate valve is opened and the foamed grout begins to flow into the filling head and through the annular groove therein into the annular space between the two tubes constituting the pipe. Then relatively light pressure is applied to the reservoir to force the foamed grout through the annular space lengthwise of the pipe. When this space is completely filled, the gate valve in the filling head is closed, the back-up plate is withdrawn and the pipe is axially withdrawn from the filling head. Excess foamed grout from both ends of the pipe falls into receptacles from where it is recirculated to the reservoir. Thereupon the walking beam mechanism lifts the pipe out of the pipe supports and deposits it upon inclined rails for movement to curing racks or the like.

BRIEF DESCRIPTION OF THE SEVERAL VIEWS OF THE DRAWINGS

FIG. 1 is an elevational view of the apparatus.
FIG. 2 is a more detailed view on an enlarged scale showing the filling head in vertical diametral cross section as viewed from the other side of the apparatus.

DETAILED DESCRIPTION

The apparatus as disclosed in FIG. 1 basically comprises a reservoir 10, a filling head 11, a back-up plate 12, pipe supports 13, a walking beam mechanism 14, rails 15 on which the pipe is fed to the apparatus and from which it passes on for subsequent processing, and the overflow receptacles 16, one beneath each end of the pipe in its filling position.

The reservoir 10 has a cover 17 which may be opened for inspection or cleaning and three ports are provided at 18, 19 and 20. Two of these ports are connected, respectively (connections not shown), to the overflow receptacles 16 which are provided with pumping means 16a to pump excess foamed slurry back to the reservoir 10 and the third one of the ports is connected to a source of foamed slurry.

The foamed slurry generally consists of portland cement and water and a foaming agent. This mixture with air under pressure is passed through a mixing hose which is at least fifty feet long so as to be thoroughly homogenized and then passes through one of the above mentioned ports into the reservoir 10.

The filling head 11 is shown in more detail in FIG. 2 and it will be seen that it includes a gate valve element 21 actuated by means of a fluid cylinder 22. The valve 21 is connected to the rod 23 of the piston in the cylinder 22 by means of a clevis pin 24.

The filling head 11 per se has an annular passage 25 terminating in an annular groove 26 into which the end of the pipe to be filled is inserted. In order to seal the pipe to the filling head for a filling operation to prevent the grout from squirting outside the pipe, the groove 26 is provided with inner and outer sealing means. These sealing means comprise an aluminum ring 27 and a U-shaped flexible element 28. On the outer periphery of the groove 26 there is a similar aluminum ring 29 with a resilient member of U-shaped cross section 30. The U-shaped elements are disposed with their bases facing each other and ducts 31 and 32 are provided, communicating with a source of air under pressure through a pipe 33.

From the foregoing description it will be understood that when an end of the double walled pipe is inserted into the groove 26 and pressure is applied to the line 33, the elements 28 and 30 will be expanded toward each other into engagement respectively with the inside of the inner one of the tubes and with the outside of the outer one of the tubes so as to seal them against the filling head 11.

It will be understood that the inner member 34 of the filling head is held to the outer portion of the filling head 35 by means of equally spaced spider elements, one of which is hollow, to constitute the passage 32. The plates 36 are hinged to the frame of the apparatus so that when the clevis pin 24 is removed, the filling head and gate valve may be swung out for cleaning or for replacement by a like filling head of a different diameter for use with pipe of a different diameter.

The pipe presently being filled by the instant apparatus ranged between eight inches and fifteen inches in diameter. Below eight inches, other types of pipe are more economical and likewise above about fifteen inches other types of pipe are more economical. Within the above mentioned range, however, pipe of a type herein discussed is currently being used in sewer service and has been found to be very economical and efficient.

At the end of the pipe remote from the filling end there is provided the back-up plate 12 which, as clearly shown in FIG. 1, is beveled as at 37 so that it does not obstruct the annular space between the two tubes. The back-up plate 12 is actuated by the piston of a fluid cylinder 38 and piston rod 39.

The rails 15 at a small inclination permit the pipe to roll from a previous operation to the apparatus of the present invention. A walking beam mechanism is generally indicated at 14 but is conventional and will not be described in detail. It simply lifts the pipe off the rails 15 and deposits it in the pipe support cradles 13. Means (not shown) are provided to move the cradle 13 laterally to move the pipe P into engagement with the filling head and to move it back out of engagement with the filling head. The back-up plate 12 serves to hold the pipe in position.

The sequence of operations is as follows. The pipe P rolls along the rails 15 and is lifted by the walking beam meachanism 14 from the rails 15 into the pipe supports on cradles 13. The back-up plate 12 advances and the supports 13 also move toward the left of FIG. 1 to advance the pipe end into the filler head 11. The back-up plate remains in this position during the filling operation. Fluid pressure is applied to the line 33 to seal the pipe end against the filler head. The gate valve 21 is then opened and initially the foamed grout flows by gravity into the filling head and into the annular space. After the gate valve is fully open light pressure is applied to the reservoir 10 by conventional means (not shown) to force the foamed grout longitudinally through the annular space. When the annular space is completely filled, pressure on the reservoir 10 is released so that excess foamed grout can be released back to the reservoir so as to relieve internal pressure in the annular space. The gate valve is then closed and the back-up plate 12 and the pipe supports 13 retract, thus removing the pipe from the filling head 11. Of course pressure is also released from the line 33 to permit the pipe to be retracted from the groove 26. At this time any excess foamed grout from the two ends of the pipe falls into the receptacle 16 from where it is pumped back to the reservoir 10. The walking beam mechanism 14 then lifts the filled pipe from the supports 13 and deposits it back on the rails 15 where it rolls on for storage and curing in a rack or other suitable arrangement. At this point, the walking beam mechanism is ready to accept another section of pipe.

It will be understood that this sequence of operations is a timed sequence and is controlled by conventional means not forming a part of the invention and not shown.

The basically important feature of the method and the apparatus herein disclosed and claimed is that it permits filling the annular space with a foamed grout without destroying the foamed character thereof as would be the case if the grout were subjected to pressure. Thus, it must be noted that when pressure is applied to the reservoir 10, it is forcing the grout throught the annular space against atmospheric pressure only and thus the pressure need only be high enough to overcome the friction of the material through the annular space and atmospheric pressure. Thus, a pressure on the order of 0.1 MN./m.$^2$ is sufficient.

It will be understood that modifications may be made without departing from the spirit of the invention and that therefore no limitation not specifically set forth is to be implied or is intended.

The embodiments of the invention in which an exclusive property or privilege is claimed are defined as follows:

1. In the method of filling the annular cylindrical spaces in a conduit formed of concentric tubes of synthetic resinous material connected by integral spacing and bracing means, comprising pumping a foamed concrete into said spaces under pressure until said spaces are substantially completely filled; the improvement comprising selecting as the mixture for the foamed concrete, a mixture consisting of water, portland cement and a foaming agent, and initially feeding said foamed concrete to said space, from one end of said conduit, by gravity, with said conduit in an approximately horizontal position, then forcing said concrete under a pressure only high enough to overcome the friction of the material through the annular space, and atmospheric pressure, through said space lengthwise of the pipe, and when said space is filled, removing said pressure and permitting excess foamed concrete to fall away, whereby to preserve the foamed character of said concrete, and curing said foamed concrete in situ.

2. The method of claim 1, wherein said concrete forcing pressure is of the order of 0.1 MN./m.$^2$.

3. The method of claim 1, including the step of collecting the foamed grout which falls away from both ends of the pipe, and recirculating it to the initial feed.

4. In the method of filling the annular cylindrical spaces in a conduit formed of concentric tubes of synthetic resinous material connected by integral spacing and bracing means, comprising pumping a foamed concrete into said spaces under pressure until said spaces are substantially completely filled; the improvement comprising providing an apparatus having a filling head, a back-up member, a reservoir for foamed concrete connected to said filling head, and means to support said pipe in an approximately horizontal position between said filling head and back-up member, positioning and supporting said pipe in a substantially horizontal position in sealing engagement with said filling head while backing the pipe with said back-up member without obstructing said annular space, opening said filling head to permit said foamed concrete to start to flow into said space by gravity, then placing said reservoir under a pressure only high enough to overcome the friction of the material through the annular space, and atmospheric pressure, to force said concrete through said space lengthwise of the pipe, removing said pressure and closing said filling head, removing said pipe from said filling head and back-up plate to permit excess foamed concrete to fall away, whereby to preserve the foamed character of said concrete, and then curing said concrete in situ.

5. The method of claim 4, wherein said concrete forcing pressure is of the order of 0.1 MN./m.$^2$.

References Cited

UNITED STATES PATENTS

| | | | |
|---|---|---|---|
| 3,427,393 | 2/1969 | Masterson | 174—23 |
| 1,774,292 | 8/1930 | Reed | 174—23 |
| 2,915,802 | 12/1959 | Dugas | 264—42 |
| 2,535,808 | 12/1950 | Mucher | 264—262 X |
| 3,379,221 | 4/1968 | Harry et al. | 52—615 |

JOHN H. MILLER, Primary Examiner

U.S. Cl. X.R.

138—148; 264—45, 262, 271, 279